Nov. 15, 1960   R. B. BEARD ET AL   2,960,678
ULTRASONIC LEVEL MEASURING APPARATUS
Filed Oct. 6, 1953   2 Sheets-Sheet 1
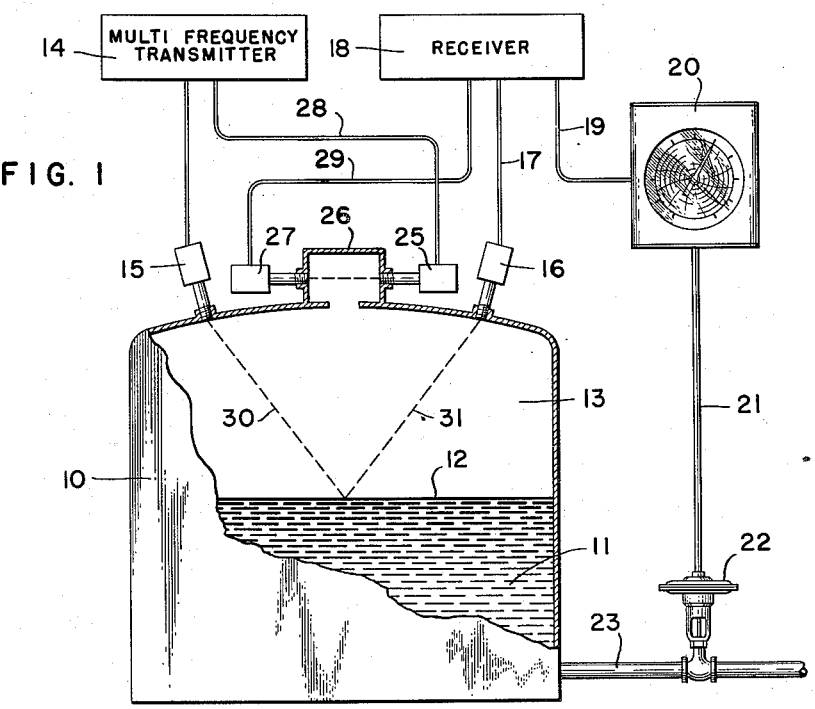
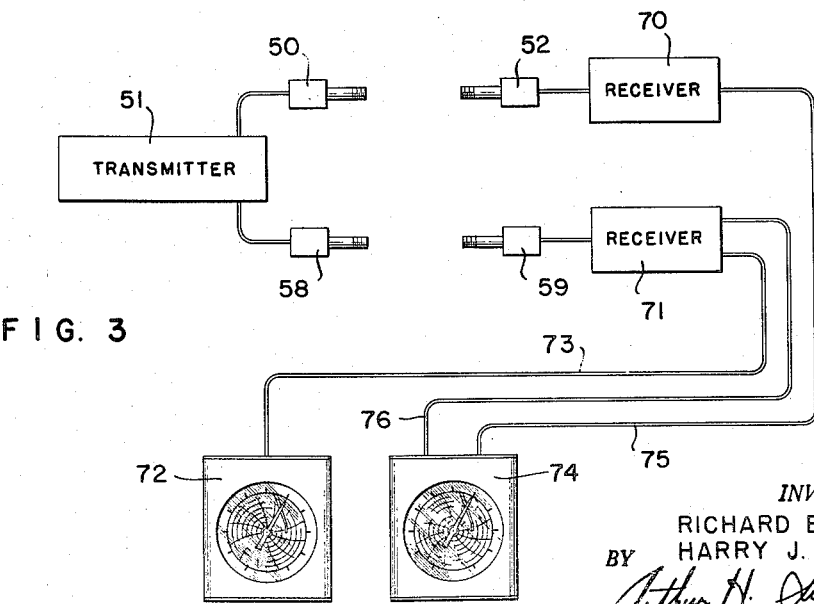
INVENTORS.
RICHARD B. BEARD
HARRY J. HARTZ
BY *Arthur H. Swanson*
ATTORNEY.

INVENTORS.
RICHARD B. BEARD
HARRY J. HARTZ
BY
ATTORNEY.

United States Patent Office 2,960,678
Patented Nov. 15, 1960

2,960,678

ULTRASONIC LEVEL MEASURING APPARATUS

Richard B. Beard and Harry J. Hartz, Philadelphia, Pa., assignors to Minneapolis-Honeywell Regulator Company, Minneapolis, Minn., a corporation of Delaware Filed Oct. 6, 1953, Ser. No. 384,486

14 Claims. (Cl. 340—1)

A general object of the present invention is to provide a new and improved apparatus for measuring the level of a fluid in a given space. More specifically, the present invention is concerned with a fluid level measuring apparatus for determining the level of a fluid in a space by measuring apparatus having level detecting elements which may be positioned so as to be in indirect association with the surface of the fluid.

For accurate fluid level measurement involving certain reactive fluids, it is necessary to employ measuring elements which are not positioned in the fluid or otherwise exposed to or in contact with it so as to extend their useful life. In the prior art, it has been proposed to determine fluid level in a space by means of mechanical wave energy signals which are transmitted into the space toward the interface between the fluid and the substance above the fluid where the signal is reflected to be received by appropriate wave energy receiving means. In such devices, the mechanical wave systems employed have operated upon the principle that a mechanical wave signal requires a known or measureable time in order to pass from a transmitting means to the interface and back to the receiver. Such apparatus is considerably limited in its field of application due to the effects of reflections and standing wave conditions that may be set up in many types of containers or confined spaces as well as the complexity of the necessary associated circuits.

It is accordingly an object of the present invention to provide a fluid level measuring apparatus which utilizes mechanical wave energy signals transmitted through a space containing a fluid utilizing the signal attenuation instead of the transit time as a measure of the fluid level.

In using apparatus of the mechanical wave energy transmission type in a confined space, it is necessary to provide means for preventing any standing wave conditions and providing means for eliminating ambient effects which are present in the space through which the mechanical wave energy is transmitted. If compensation is not made for the ambient conditions in many instances, the accuracy of the measurement cannot be assured.

It is therefore a still more specific object of the present invention to provide a new and improved measuring apparatus for measuring the level of a fluid in a space employing mechanical wave energy transmitted through the space with the mechanical wave energy frequency being selected to eliminate standing wave conditions and further mechanical wave energy apparatus being provided for eliminating ambient effects present in the space.

Another more specific object of the present invention is to provide a new and improved fluid measuring apparatus for determining the level of a fluid in a space where a confined mechanical wave energy signal is applied to the space and reflected from an interface adjacent to a receiving means with the attenuation of the mechanical wave signal being an indication of the fluid level.

A still further more specific object of the present invention is to provide a fluid measuring apparatus for a fluid in a confined space where mechanical wave energy is transmitted through the fluid and the substance thereabove to a receiving means with the attenuation of the signal being a measure of the fluid level in the space.

A still further object of the present invention is to provide with the foregoing objects of the invention means for compensating for ambient conditions by transmitting mechanical wave energy through a space wherein the energy passes through a fixed distance path.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 shows a preferred form of fluid measuring apparatus wherein the fluid has a definable interface with a substance thereabove;

Fig. 3 shows a form of the apparatus of Fig. 2 wherein a fluid level and a density measurement may be obtained.

Figure 2:
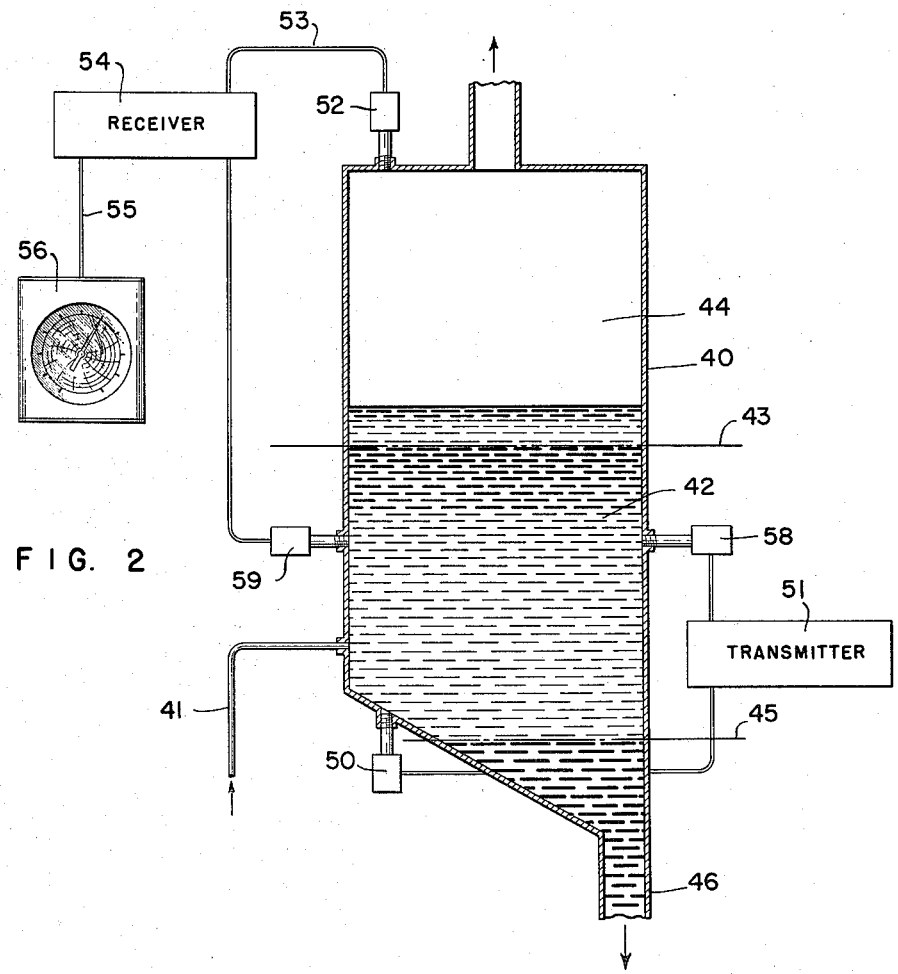
Fig. 2 shows a modified fluid level measuring apparatus wherein the interface between the fluid and the substance thereabove is not clearly defined.

Referring to Fig. 1, the numeral 10 represents a tank or space which contains a fluid or liquid 11 whose level in the tank is to be determined. This fluid or liquid may well be bulk oil or any other liquid which is capable of defining a definite interface 12 on the upper surface thereof between the liquid 11 and the space or substance 13 above the liquid.

The measuring apparatus for the tank 10 includes a multi-frequency transmitter 14 which has an output connection for supplying the output electrical signal to the mechanical wave producing transmitter 15. Mechanical wave energy from the tank is received by a receiving transducer 16 which is coupled by way of a cable 17 to a suitable receiver apparatus 18. The received electrical signals are converted into appropriate direct current and applied by way of the cable 19 to the input of a suitable indicating and recording instrument 20. The instrument 20 may well be of the self-balancing potentiometric type such as is disclosed in the patent to W. P. Wills, 2,423,540, issued July 8, 1947. The output of the instrument 20 may be in the form of a pneumatic pressure which is applied through a conduit 21 to a control valve 22 which may be used to regulate the height of the liquid 11 within the tank 10 by controlling the flow of the liquid to the tank by way of the conduit 23.

For compensating for ambient conditions in the space wherein the mechanical wave energy is transmitted, there is provided a second mechanical wave energy transmitting transducer 25 which is adapted to transmit mechanical wave energy through a space 26 to a mechanical wave receiving transducer 27. The transmitting transducer 25 is energized by the transmitter 14 by way of a cable 28. The output of the receiving transducer 27 is coupled by way of a cable 29 to the receiver 18.

The operation of the apparatus of Fig. 1 may best be understood by first noting that mechanical wave energy transmitted through a given space will be absorbed or attenuated by the space by an amount proportional to the distance through which the wave energy is transmitted. Further, mechanical wave energy has the characteristic of being readily reflected from an interface between two dissimilar fluids. Thus, the interface 12 between the liquid 11 and the substance 13 above the liquid serves as an excellent reflecting surface for mechanical wave energy which is directed toward the interface.

In the arrangement of Fig. 1, the transmitting transducer 15 produces mechanical wave energy signals which will be directed toward the interface 12 as indicated by the dotted line 30. The reflections from the interface, indicated by the dotted line 31, are directed toward the receiving transducer 16. The distance that the mechanical wave energy signal travels will be dependent upon the height of the liquid 11 in the tank 10 or the height of the interface 12. The received mechanical energy is converted into an appropriate electrical signal by the receiving transducer 16 with the electrical signal being supplied to the input of the receiver apparatus 18. The received signals are converted into a direct current signal which will be applied to the input of the instrument 20 and will be of a magnitude directly proportional to the height of the interface 12 in the tank 10.

A multiple frequency transmitter has been selected to eliminate the effects of standing waves which may be particularly bothersome in apparatus of the present type where the height of the interface, and therefore the effective inner dimensions of the tank 10 vary and tend to resonate at different frequencies. A suitable multi-frequency transmitter source may take the form of a noise generator which is capable of producing statistically random noise which in reality is a wide band of frequencies having substantially constant magnitudes. A representative showing for such a transmitter will be found in the copending application of Richard B. Beard, Serial No. 384,485, entitled "Measuring Apparatus," and filed on even date herewith, now Patent No. 2,768,524. This Beard application also shows representative circuits for a receiver such as receiver 18. The details for the transmitting and receiving transducers 15 and 16 as well as 25 and 27 will also be found in said copending application.

Inasmuch as the attenuation of the mechanical wave energy through the substance 13 will vary with the ambient conditions of that substance, it is essential that some compensating means be provided to eliminate the effects of these ambient conditions. For this purpose, the space 26 on the top of the tank 10 has been provided and this space will be filled with the substance which is above the interface 12. The transmitting transducer 25 will produce mechanical wave energy which will be transmitted directly to the receiving transducer 27 through the space 26 with the distance always remaining fixed. Thus, the signal from the transmitting transducer 25 will be attenuated a fixed amount which will vary in accordance with the changes in the ambient conditions in the substance above the interface 12. The output of the receiving transducer 27 will be applied to the input of the receiver 18 where it will serve to provide a signal varying with the ambient conditions of the substance 13. This signal may be used to eliminate the ambient change effects of the signal applied to the receiver 18 by the level measuring receiving transducer 16.

It will be readily apparent that if the apparatus is adequately compensated for ambient conditions, the instrument 20 may be calibrated directly in liquid level and the instrument may be used to accurately control the level of the liquid 11 within the tank 10.

In the event that the ambient conditions over the liquid 11 remain constant, it is possible to eliminate the compensated transmitting and receiving transducers 25 and 27 and the associated circuitry necessary in receiver 18.

The apparatus shown in Fig. 2 is a modified form of fluid level measuring apparatus adapted for use wherein there is no clear interface defined between the substances which are in the space where the level is to be determined. In Fig. 2, numeral 40 represents a catalytic reactor. This reactor may be used in an oil refinery for cracking an oil vapor which is applied into the reactor. The inlet to the reactor is by way of a pipe 41 which passes oil vapor and a fine powdered catalyst into the chamber or reactor 40. The catalyst is frequently referred to, when the oil vapor is acting with the catalyst, as a fluidized catalyst. This fluidized catalyst has many of the attributes of a liquid in that hydraulic theory may be applied to the catalyst in fluid form. This fluidized catalyst is indicated by the numeral 42 and is of effectively constant density through most of the depth in the reactor 40. Above the line 43, the density of the fluidized catalyst begins to decrease due to the fact that the fine particles of catalyst tend to accumulate near the surface of the fluidized catalyst. Since it is rather difficult to define a clear interface between the gaseous condition existing above the fluidized catalyst in the area 44, it is essential to provide some other means for measuring the level of the fluidized catalyst. Below the line 45 in the reactor 40, the density of the fluidized catalyst begins to increase and the catalyst settles out passing through the outlet 46 where it may be fed to a suitable regenerator.

Positioned above the line 45 and in mechanical wave energy transmitting relationship with the fluid 42 is a mechanical wave transmitting transducer 50. This transducer is supplied with electrical energy by a suitable transmitter 51 which may be of the type shown at 14 in Fig. 1. Positioned at the top of the reactor 40 is a receiving transducer 52 which is adapted to receive the mechanical wave energy transmitted from the transmitting transducer 50. This receiving transducer is coupled by way of a cable 53 to the input of a suitable receiver amplifier 54. This receiver will have an electrical output proportional to the magnitude of the received signal and the output will be applied by way of a cable 55 to the input of an indicating instrument 56. The receiver 54 and the indicating instrument 56 may well take the form of the corresponding apparatus shown in Fig. 1.

In order to compensate for density changes of the fluidized catalyst, the level measuring apparatus may include a second transmitting transducer 58 and a receiving transducer 59 which are adapted to measure the absorption of the fluidized catalyst along a fixed path through the reactor 40. This measurement is preferably made at a point where the fluidized catalyst has a substantially uniform character representative of the bulk of the catalyst in the reactor.

In considering the operation of Fig. 2, it will first be noted that the transmitter 51 will be applying an electrical signal comprised of a large number of frequencies to the transmitting transducer 50. This transducer will transmit the mechanical wave energy in an upward direction through the fluidized catalyst 42 and the space 44 to the receiving transducer 52. The received signal will be converted to an electrical signal and applied to the receiver 54, the latter of which will produce a direct current proportional to the magnitude of the signal received by the receiving transducer 52. This direct current signal will in turn supply an operating voltage on the indicating instrument 56 so that this instrument may appropriately indicate the amount of signal absorbed by the fluidized catalyst. As this absorption will be dependent directly upon the level of the fluidized catalyst in the reactor 40, the instrument 56 may be directly calibrated in terms of the fluidized catalyst.

As the density of the fluidized catalyst may not always remain the same due to changes in the size of the catalyst particles or the density of the oil vapor supplied to the reactor, it is essential that some ambient compensation be provided. The ambient compensation is effective in a manner corresponding to the ambient compensation effected in Fig. 1. Here, the mechanical wave transmitting transducer 58 transmits mechanical wave energy through the fluidized catalyst 42 to the receiving transducer 59. The path through which the mechanical wave energy passes will remain fixed. Since the distance through which the wave energy travels is constant, the only thing that will affect the magnitude of the received energy of transducer 59 will be the density of the fluidized catalyst. While connecting the output of the receiving transducer 59 in with the receiver 54, the density variations affecting the magnitude of the electrical signal in the receiving transducer 52 may be effectively eliminated. In this manner, the output electrical signal from the receiver 54 will be a signal which will vary proportionally with the level of the fluidized catalyst 42 in the reactor 40.

The apparatus of Fig. 3 shows a further modification of the apparatus of Fig. 2 wherein it is desired to obtain both the measurement of the level of the fluidized catalyst and the density of the fluidized catalyst. In the arrangement of Fig. 3, the transmitter and transmitting transducers are the same as those of Fig. 2 and carry corresponding reference numerals. They are applied to the fluid container in the same way as in Fig. 2. The receiving transducers are also the same as the receiving transducers of Fig. 2. In the present figure, however, the outputs of the receiving transducers 52 and 59 are applied to separate receivers so that the output of the separate receivers 70 and 71 may be separately observed by the density indicating instrument 72 which is coupled to the input of the receiver 71 by a cable 73 and a level indicating instrument 74 which will have as an output electrical signals from both of the receivers 70 and 71 applied to the instrument by way of the cables 75 and 76 respectively.

By providing the separate receiver section 71, the instrument 72 may be arranged to respond directly to the density of the fluidized catalyst as evidenced by the attenuation of the mechanical wave energy transmitted between the transmitting transducer 58 and the receiving transducer 59.

As in Fig. 2, it is desirable to compensate for changes in the density of the fluidized catalyst and for this purpose, the output of the receiver 71 is applied to the instrument 74 so that this signal may be compared with the signal received from the level measuring transducer 52.

It will be readily apparent that the configuration of all of the figures may be modified in accordance with the particular level measuring problem at hand. Thus, it may be desirable to incorporate as a compensating means the density measuring apparatus or ambient measuring apparatus of the type shown in the above mentioned copending application of Richard B. Beard.

While, in accordance with the provisions of the statutes, there has been illustrated and described the best forms of the embodiments of the invention known, it will be apparent to those skilled in the art that changes may be made in the forms of the apparatus disclosed without departing from the spirit of the invention as set forth in the appended claims and that in certain cases, certain features of the invention may be used to advantage without a corresponding use of other features.

Having now described our invention, what we claim as new and desire to secure by Letters Patent is:

1. Apparatus for measuring the level of a fluid in a space, comprising, mechanical wave energy transmitting means positioned to transmit mechanical wave energy through the space in a direction so that the energy passes through the fluid and the substance above the fluid, a receiving means for said wave energy, and attenuation responsive means connected to said receiving means, said attenuation responsive means having an output proportional to the level of the fluid in the space.

2. Apparatus for measuring the level of a fluid in a space wherein said fluid has a definite interface between the fluid and the substance above the fluid comprising, transmitting means arranged to transmit mechanical wave energy toward the interface, wave energy receiving means arranged to receive wave energy reflected from the interface, and wive energy attenuation measuring means connected to said receiving means for indicating the level of the fluid in the space.

3. Apparatus for measuring the level of a liquid in a space wherein said liquid has a definite interface between the liquid and the substance above the liquid, comprising, transmitting means arranged to transmit mechanical wave energy toward said interface from a point above said liquid, wave energy receiving means arranged to receive wave energy through said substance as reflected from said interface, and wave energy attenuation measuring means connected to said receiving means for indicating the level of the liquid in the space.

4. Apparatus for measuring the level of a fluid in a space comprising, mechanical wave energy transmitting means arranged to transmit mechanical wave energy through the space in a direction so that the energy passes through the fluid and the substance above the fluid, a receiving means for said wave energy, attenuation responsive means connected to said receiving means, said attenuation responsive means having an output proportional to the level of the fluid in the space, and fluid density compensating means connected to said attenuation responsive means to alter the effect of said receiving means on said attenuation responsive means in accordance with variations in density of said fluid.

5. Apparatus as defined in claim 4 wherein said density compensating means comprises a mechanical wave energy transmitting and receiving means arranged to pass wave energy through the fluid.

6. Apparatus for measuring the level of a fluid in a space wherein said fluid has a definite interface between the fluid and the substance above the fluid comprising, transmitting means arranged to transmit mechanical wave energy toward the interface, wave energy receiving means arranged to receive wave energy reflected from the interface, wave energy attenuation measuring means connected to said receiving means for indicating the level of a fluid in the space, and means for measuring the attenuation characteristic of a fixed path in the space through which the first mentioned wave energy is transmitted, said last mentioned means being connected to provide compensation for said receiving means for variations in the ambient conditions of the said portion of said space.

7. Apparatus as defined in claim 6 wherein said means for measuring the characteristics of a fixed path in the space comprises a second means for transmitting and receiving mechanical wave energy.

8. Apparatus for measuring the level of a fluidized catalyst in a chamber, the combination comprising, mechanical wave energy transmitting means adapted to transmit mechanical wave energy through the chamber in a direction so that the wave energy passes through the fluidized catalyst and the substance above the catalyst, means for receiving the mechanical wave energy positioned in said chamber at a point opposite said transmitting means, and mechanical wave energy attenuation measuring means connected to said receiving means for indicating the level of the fluidized catalyst in said chamber.

9. Apparatus as defined in claim 8 wherein compensating means are provided whereby said signal attenuation measuring apparatus is compensated for changes in the density of said fluidized catalyst.

10. A measuring apparatus for determining the level of a fluidized catalyst in a chamber comprising, transmitting means for transmitting mechanical wave energy through the chamber in a direction to include the fluidized catalyst and the substance above the catalyst, mechanical wave energy receiving means positioned opposite said transmitting means adapted to receive the mechanical wave energy transmitted through the fluidized catalyst and the substance thereabove, signal attenuation measuring means connected to said receiving means for indicating the level of said fluidized catalyst in said chamber, a second mechanical wave energy transmitting means and receiving means connected to transmit and receive mechanical wave energy through a fixed path containing the fluidized catalyst, means including said last mentioned means for compensating said signal attenuation measuring means so that said attenuation measuring means will accurately indicate the level of the fluidized catalyst when the density of said catalyst changes.

11. Apparatus as defined in claim 10 wherein said second receiving means has a density measuring means connected thereto.

12. Apparatus for measuring the level of a liquid in a space comprising a mechanical wave transmitter mounted in a first predetermined position relative to the liquid in said space so that mechanical waves will be transmitted through the space toward the surface of said liquid, a mechanical wave receiver mounted in a second predetermined position displaced from said transmitter to receive from said surface mechanical waves transmitted by said transmitter, said mechanical wave being variably attenuated in accordance with the level of the liquid in the space, ambient compensating means positioned relative to said space to measure the ambient conditions in said space, and means connecting said compensating means to said receiver to modify the output of said receiver in accordance with the changes in the measured ambient conditions.

13. Apparatus as defined in claim 12 wherein said ambient compensating means comprises a second mechanical wave transmitter mounted in a predetermined position to transmit mechanical wave energy through said space along a predetermined path which is representative of the ambient conditions in said space, and a second mechanical wave receiver positioned to receive the mechanical wave energy transmitted along said path.

14. Fluid level measuring apparatus comprising a container the fluid level in which is to be determined, a mechanical wave transmitter positioned to transmit mechanical wave energy into said container toward the surface of said fluid, a mechanical wave receiver positioned to receive from said surface mechanical wave energy transmitted by said transmitter, said mechanical wave energy being variably attenuated in accordance with the level of said fluid in said container, and means responsive to the attenuation of said transmitted mechanical wave energy connected to said receiver to provide an indication of the level of said fluid in said container.

References Cited in the file of this patent

UNITED STATES PATENTS

| | | |
|---|---|---|
| 2,016,906 | Rice | Oct. 8, 1935 |
| 2,047,974 | Lehr et al. | July 21, 1936 |
| 2,156,519 | Walker | May 2, 1939 |
| 2,480,646 | Grabau | Aug. 30, 1949 |
| 2,527,208 | Berry et al. | Oct. 24, 1950 |
| 2,584,128 | Hildyard | Feb. 5, 1952 |
| 2,612,772 | McConnell | Oct. 7, 1952 |
| 2,768,524 | Beard | Oct. 30, 1956 |
| 2,787,160 | Van Valkenburg | Apr. 2, 1957 |

FOREIGN PATENTS

| | | |
|---|---|---|
| 934,118 | France | Jan. 7, 1948 |
| 80,498 | Norway | July 21, 1952 |
| 663,946 | Great Britain | Jan. 2, 1952 |